United States Patent

[11] 3,593,818

[72] Inventors Reimar Pohlmann
Im Johannistal 33, 51 Aachen;
Joachim Herbertz, Roermonder Strasse 2,
5105 Laurensberg, both of, Germany
[21] Appl. No. 851,691
[22] Filed Aug. 20, 1969
[45] Patented July 20, 1971
[32] Priority Jan. 22, 1969
[33] Germany
[31] P 19 02 907.3

[54] METHOD AND APPARATUS FOR ENERGY DENSITY MEASUREMENTS IN STANDING ULTRASONIC WAVE FIELDS
19 Claims, 5 Drawing Figs.
[52] U.S. Cl. .................................................. 181/.5 ED
[51] Int. Cl. .................................................. G10k 13/00
[50] Field of Search .......................................... 340/1, 3, 15; 73/67.2, 69; 181/0.5; 325/67

[56] References Cited
UNITED STATES PATENTS
| | | | |
|---|---|---|---|
| 3,098,211 | 7/1963 | Gerber ........................ | 340/8 |
| 3,158,831 | 11/1964 | Boyer ........................ | 340/5 |
| 3,179,823 | 4/1965 | Nesh ........................ | 310/8.4 |

*Primary Examiner*—Rodney D. Bennett, Jr.
*Assistant Examiner*—Nelson Moskowitz
*Attorney*—Michael S. Striker

ABSTRACT: A method and apparatus for measuring the energy density in confined fluids which are excited ultrasonically. A spherical probe is immersed into the fluid with ultrasonic sensors uniformly distributed over a spherical surface, so that the sensors are located at the vertices of regular polyhedrons. The sensors convert the measured parameters into corresponding electrical signals which are processed by squaring and averaging to provide an indication of the energy density. The sensors are imbedded within a substance having a substantially high capacity for sonic absorption.

PATENTED JUL20 1971 3,593,818

INVENTOR
REINAR POHLMAN
JOACHIM HERBERTZ
BY
ATTORNEY

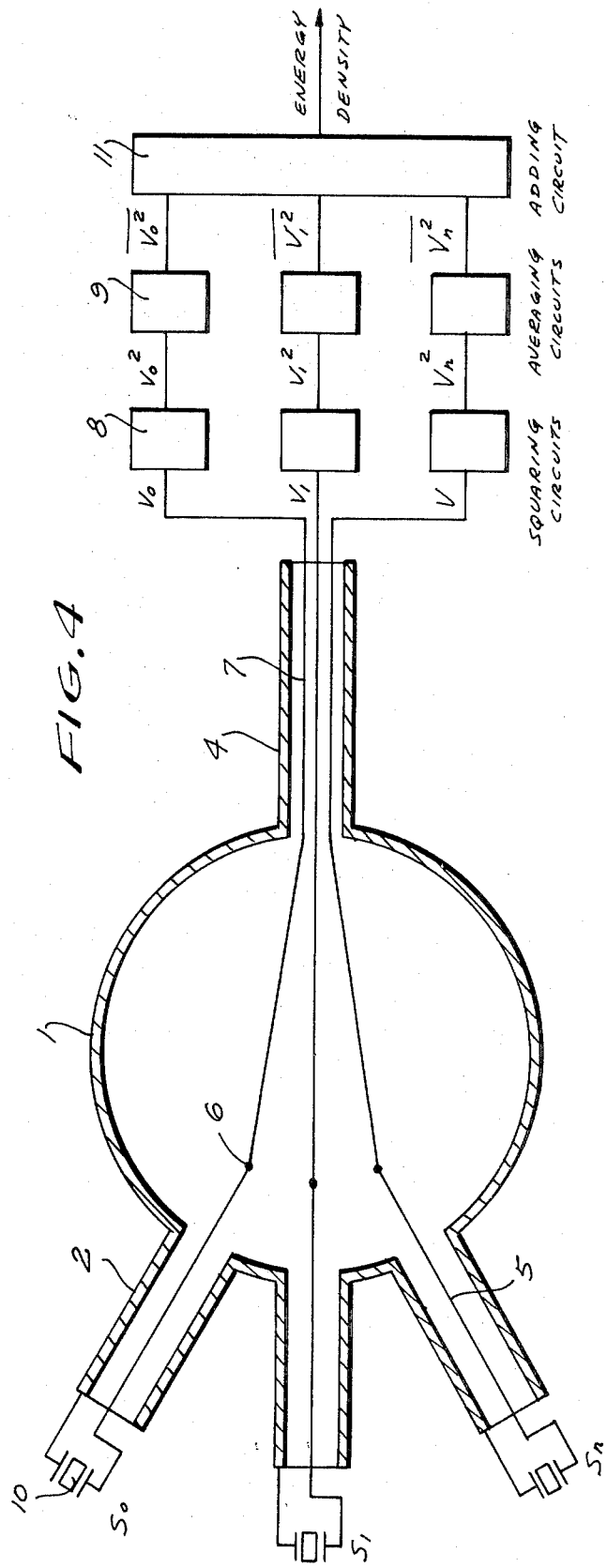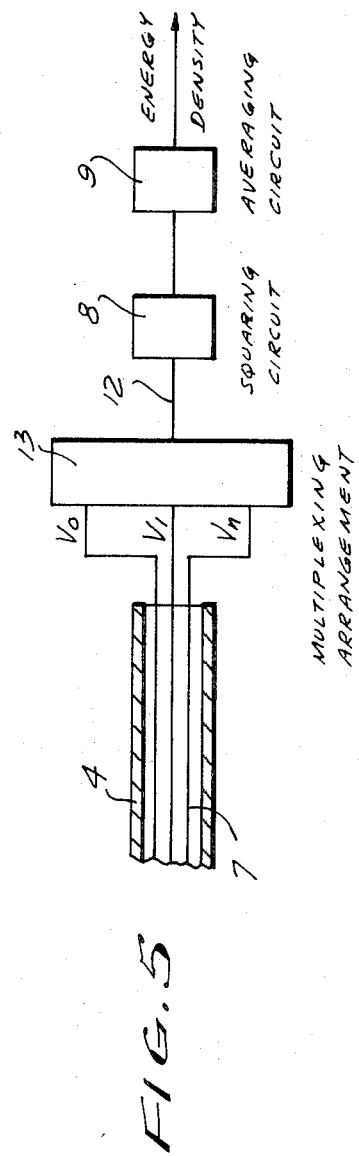

METHOD AND APPARATUS FOR ENERGY DENSITY MEASUREMENTS IN STANDING ULTRASONIC WAVE FIELDS

BACKGROUND OF THE INVENTION

Heretofore, it has been very difficult to determine the energy density in ultrasonically excited fluid spaces. Such energy determination, on the other hand, is very important, since baths with fluid contents ultrasonically excited, have a large role in such processes as, for example, ultrasonic cleansing. Furthermore, the technical determination of the energy density is particularly important in baths with fluid contents that are excited through ultrasonic oscillations and are applied to processes which are carried out in confined fluid spaces.

Accordingly, it is an object of the present invention to provide a process for determining the energy density of an ultrasonically excited bath, and to provide an arrangement for carrying out such a process. It is the object of the present invention to provide a method and means for such energy density measurement, in which the desired measurement is realized through a single immersion of a sensor in the ultrasonically excited fluid, and to evolve the desired measurement through a single sensing operation.

In the past, it was attempted to realize such energy density measurement through the immersion of a thermoelectric or piezoelectric sensor or probe. In such a process, however, no singular or unique measured value may be realized because a standing wave field prevails in the ultrasonically excited fluid space in which the measurements are to be carried out. In this standing wave field, the sonic pressure or sonic velocity vary from point to point. It has also not been possible to establish a precisely defined measuring point within the bath itself, and to use such specific measuring point or measuring location continuously as a reference location. This results from the condition that the measured values do not vary only with respect to location, but, moreover, they also vary as a function of time. Such time variation in the signals may, for example, be produced through temperature rise and temperature variations.

All of these difficulties are avoided and are set aside through the process and arrangement of the present invention for determining the energy density in ultrasonically excited fluid spaces. In accordance with the present invention, a plurality of ultrasonic sensors are uniformly distributed over the exterior surface of a sphere. The diameter of this sphere is an integral multiple of the half wavelength of the sonic wave. By adding the measured signal values realized from the individual sensors, the energy density may be determined.

It has been found that a probe of this type with a multiple or plurality of ultrasonic sensor, can be particularly well adapted to measuring the energy density by integrating the individual values, when the sensors are located at the vertices of regular polyhedrons. When the spherical surface is density occupied, a combination of icosahedron and dodecahedron is used. In another number of locations or points, the combination of a hexahedron and octahedron may, for example, be used. An integral probe constructed with sensors in this manner, allows the energy density to be determined, independent of the position and orientation of the sensors with respect to the standing ultrasonic wave field.

The ultrasonically sensitive sensors may, for example, operate on a thermoelectric basis, in which case the sensor consists of thermoelectric elements which are surrounded with a substance which has a maximum high capacity for sound absorption. Natural substances for ultrasonic absorption may be further improved in their absorption characteristics, by imparting to them small gas bubbles. Furthermore, the temperature rise within the substance, may be converted to an electrical signal by providing that the sensor consists of temperature dependent resistors or semiconductors which are surrounded by the aforementioned substance with maximum high sound absorption.

If the first case is used in which thermoelectric elements are embedded within the sound-absorbing substance, opposite or reference soldered locations are required which are sufficiently in thermocontact with the surrounding fluid, so that they assume the temperature of the fluid. The temperature difference of the values realized from the sensors within the sound-absorbing substance, and the opposite or reference-soldered locations, will then provide a thermoelectric voltage from each sensor. The sum of the thermoelectric voltage signals from all sensors is used to provide an integrated value from which the energy density is determined. It is possible to observe from this situation, that such an arrangement is, in the first place, independent of the temperature of the fluid. This results from the condition that a temperature difference, under these circumstances, results only from the absorbed ultrasonic energy by the sensors, and such temperature difference leads to a measuring indication.

If the last-mentioned case is used in which temperature dependent resistors or semiconductor elements are embedded within the sound absorption substance, only a single oppositely functioning resistor is required in good thermal contact with the fluid. In this arrangement, the temperature difference becomes again realized by compensating for the sensor resistance and the oppositely functioning resistance through a bridge circuit.

In both cases, it is of advantage to arrange the aforementioned oppositely functioning soldered locations or the oppositely functioning resistors in proximity to the measuring points of the respective sensors. In accordance with the present invention, this may be achieved advantageously by locating such oppositely functioning locations of the thermoelectric elements or oppositely functioning resistors within a centrally lying sphere.

To maintain the sensitivity and thereby the temperature rise of the absorption body within the ultrasonic field at the maximum possible magnitude, it is desirable that the heat conduction from the electrical conductors be made as small as possible. If, now, the electrical conducting wires are made very thin, then the electrical resistance of the arrangement increases the the sensitivity becomes, as a result, lowered. A particular advantageous design is achieved by making the cross sections of the terminals of both thermoelectric wires, inversely proportional to the heat conductivity or electrical conductivity of the material. In this manner, the conductivity in both terminals is made of the same magnitude. As a result of the softening of the absorption bodies at higher temperatures, these bodies possess a larger capacity for ultrasonic absorption. Accordingly, the sensitivity of the arrangement increases with rising temperature. For this reason, it is desirable to compensate against such temperature variation by providing in the arrangement, an electrical resistor which is temperature dependent. Depending upon its negative or positive temperature coefficient, such temperature dependent electrical resistor becomes connected in parallel or in series with the output.

In the application of ultrasonically excited baths, it is essential to note that the problem resides in comparing the acoustical output of different baths. As in ultrasonically excited tanks, strong standing wave fields are developed within the liquid, and therefore the measurement at any point in the field does not determine the energy density. Accordingly it is essential to take measurements at a greater number of points. For practical purposes, it is indispensable to conduct the test over different points, simultaneously, to obtain a general representative value. The latter, however, contains a sinusoidal component with half the wavelength due to standing acoustical waves. The spacial arrangement of the test points must be chosen, therefore, so that this sinusoidal component is made as small as possible.

The integral probe described by Pohlman in Acustica 1960 Vol. 10 was a first solution to this problem. This probe consists of 85 thermocouples which are arranged in the form of a grating or grit with a grating constant of one-fourth the wave length at 20 kHz. in water. Each thermocouple is embedded in a sound-absorbing sphere of synthetic material. The temperature of this synthetic material or plastics increases in the sound field proportional to the square of the amplitude. To compensate for the temperature of the liquid, one end of the thermocouple is placed in a case which is shielded against sound but is, at the same time, porous to water.

Although such an instrument will produce, in ultrasonically excited liquids, substantially satisfactory measurements of the energy density of the medium, the weak suppression of the waviness, the dependence of the indication on the dipping direction, and the construction for only one frequency give rise to difficulties in practical use.

Manufacturers and industrial users of especially large ultrasonic cleaning devices have, recently, demanded a reliable and reproducable procedure for measuring the medium energy density in ultrasonically excited tanks filled with liquid. In practical applications, the energy density measuring instrument should be applicable at 40 kHz. as well as at 20 kHz. For this reason, a spherical unit, in accordance with the present invention, is provided for achieving the aforementioned objects.

SUMMARY OF THE INVENTION

A method and apparatus for measuring the energy density of confined ultrasonically excited liquids. A probe has a spherically-shaped member which serves as the mounting means of a plurality of ultrasonic sensors which are spaced from the spherical surface, and are held in place through tubes secured to the sensors and the spherically-shaped member. The ultrasonic sensors may be in the form of thermoelectric elements, piezoelectric elements, temperature dependent resistors or semiconductors. These sensing elements are imbedded within a mass or substance having a substantially high capacity for sonic absorption. The imbedded sensors are located at vertices of polyhedrons, and the entire assembly of the probe is immersed within the liquid, the energy density of which is to be measured. The sensors develop electrical signals indicative of the measured parameters, and these electrical signals become squared from the individual sensors and the squared values are averaged so as to obtain an average quantity which is representative of the energy density being sought.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a functional schematic diagram of the arrangement for squaring and averaging the measured values from the ultrasonic sensors attached to the probe of FIG. 1; and FIG. 5 is a functional schematic diagram and shows the method of sampling the measured values from the ultrasonic sensors for the purpose of diminishing the amount of equipment required to achieve the results of FIG. 4.

DESCRIPTION OF THE PREFERRED EMBODIMENTS

Figure 1:
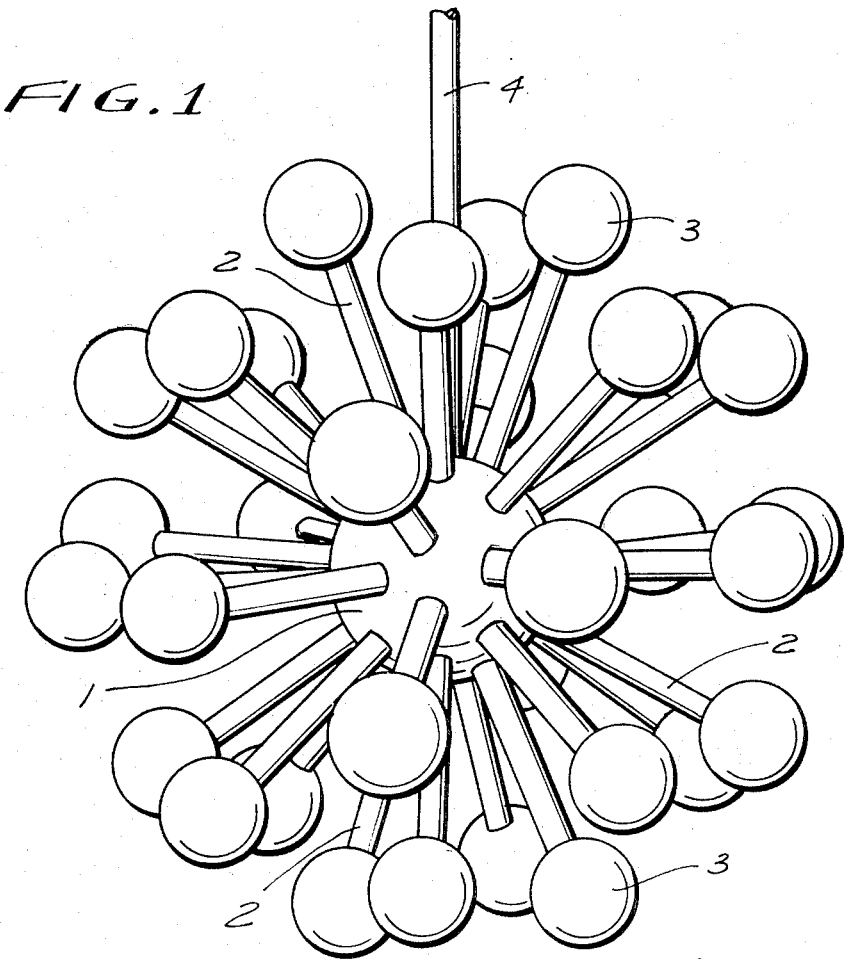
FIG. 1 is an isometric view of the spherical probe, in accordance with the present invention, for determining the energy density of confined ultrasonically excited liquids.

Referring to the drawing, the centrally arranged sphere 1 may be constructed in the form of two hemispheres assembled together. Substantially small tubes 2 are soldered into the wall of the sphere 1. The lengths of the tubes 2 are adjusted and arranged so that their end points or terminal points lie along the vertices of a regular polyhedron. At the same time, the end points or terminal points of the tubes 2 may coincide with the vertices of a surface or configuration generated through the combination of two polyhedrons. One such combination may, for example, consist of polyhedrons situated within the interior of other polyhedrons. Such combinations may, for example, involve icosahedrons and dodecahedrons, or hexahedrons and octahedrons.

Small absorption elements 3 are mounted at the end points of the tubes 2 projecting from the sphere 1. Within these absorption elements 3, are retained the thermoelectric elements, temperature dependent resistors, or semiconductors. The electrical connections to the corresponding soldered locations or resistors within the interior of the central sphere 1, are passed through the tubes 2. Thus, electrical conductors in the form of wires may be used to connect the temperature dependent elements within the members or absorption bodies 3, with the interior of the sphere 1. A tubular member 4 or tube or pipe 4 serves as a means of support for the assembly of the sphere 1, the bodies or members 3, as well as the interconnecting tubes 2. At the same time, the tube 4 serves as a conduit through which connections may be passed from the interior of the sphere 1 and connected to an exterior source or operating arrangement.

The preceding arrangement operates on the basis of converting ultrasonic energy into heat for producing a temperature difference, and for this reason, absorption members must always be present. It is, however, difficult to find substances with high sound absorption capacity and which are, at the same time, inert or chemically resistant to all fluids that may be possibly used, and do not also change their characteristics with age. Accordingly, it is therefore of considerable advantage to use small piezoelectric elements as ultrasonic sensors. These piezoelectric elements may then be arranged to sense directly the sound pressure amplitude at the respective instant that which such amplitude is measurable. These piezoelectric sensors will then provide voltage signals which are dependent upon the sonic pressure. At the same time, however, these signal voltages are associated with specific phase values. As a result of such a phase relationship designated with the signal voltages from the piezoelectric elements, simple addition or summation of the voltage signals emitted by the individual sensors, are no longer possible for the purpose of realizing the desired measured value. When dealing with such signal voltages, therefore, it is necessary to first square the signals derived directly from the sensors, and then to obtain the average value or mean of the resulting squared signals, for the purpose of determining the energy density. Whereas such squaring and averaging processes may be realized through conventional electronic means, an arrangement of this type is considerably complex and requires a large amount of equipment.

A simpler arrangement, on the other hand, may be realized when the individual piezoelectric sensing elements are rapidly sampled in periodic sequence through a multiplexing arrangement, for example. Such multiplexing arrangement may be used thereby to scan across each of the outputs of the individual piezoelectric elements, in a systematic manner, and in periodic sequence. The resulting voltage signals derived from this sampling process are then squared and the average value is realized. The resulting average value or mean is then a measure or indication of the energy density prevailing from the standing ultrasonic wave field.

Figure 2:
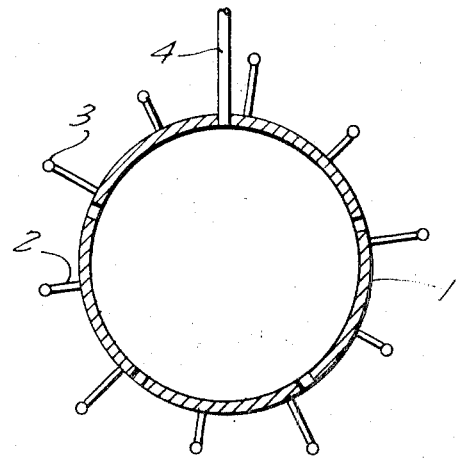
FIG. 2 is a sectional view through the spherical probe of FIG. 1.
Figure 3:
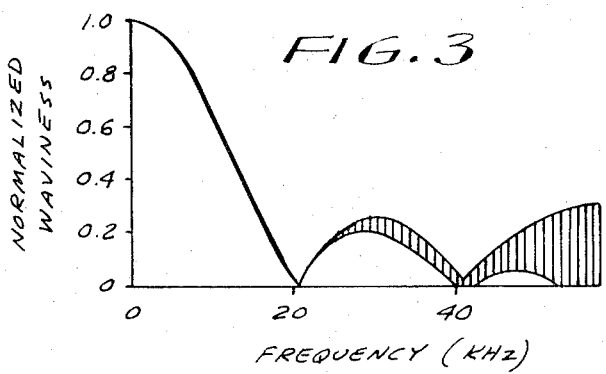
FIG. 3 is a graphical representation of the standardized waviness of the signal as a function of the frequency.

Thus, as an illustrative example, the spherical integral probe of FIG. 2 is provided with dodecahedron/icosahedron arrangement of the measuring point. Substantially no wavy component is realized as a result of using only 32 point probes of this arrangement, at 20 and 40 kHz. The point probes are arranged on a spherical surface having a radius of a quarter of the wavelength at 20 kHz., corresponding to the corners of a dodecahedron combined with an icosahedron. The standardized waviness of the signal as a function of frequency, is shown in FIG. 3. The waviness values depend on the orientation of the probe in a standing wave antinode. These values are shown in the shaded area.

In the embodiment of FIG. 4, for example, the individual sensors $S_0, S_1,...S_n$ consist of piezoelectric transducers 10. By means of conducting lines 5, electrical signals derived from the individual sensors through the elements 10, are applied to soldered connections 6 within the sphere 1. Signal transmission lines 7 convey the voltage signals from the individual sensors through the tube 4 and apply them to squaring circuits 8. Each one of the sensors has a corresponding squaring circuit, so that the electrical signal derived from the transducers 10 is squared. Thus, the voltages $V_0, V_1,...V_n$ representing the signals derived from the individual sensors, are each squared through squaring circuits 8. The outputs from these squaring circuits 8 are applied to averaging circuits 9, and subsequently added in the adding circuit 11. The output of this adding circuit represents the energy density of the fluid. The squaring circuits 8 and averaging circuits 9 and the adding circuit 11 are conventional electronic circuits well known in the art, and for this reason they are not further described here in detail.

For the purpose of reducing the amount of circuitry and equipment required to achieve the desired result through the embodiment of FIG. 4, a sampling or multiplexing arrangement may be provided as illustrated in FIG. 5. In this embodiment, the voltage signals $V_0, V_1,...V_n$ are applied to terminals of a multiplexing arrangement 13. The latter is merely a switching arrangement, the electrical output 12 of which, will as a function of time transmit the different sensor voltage signals $V_0, V_1,...V_2$. The oput 12 is connected directly to a single squaring circuit 8, similar in construction to that described in relation to FIG. 4. As a result, the output of this squaring circuit 8 provides the squared values of the sensor signal voltages, in sequence, and as a function of time. The output of the squaring circuit 8 is, connected to averaging circuit 9 similar in construction to that described in relation to FIG. 4. The output voltage of the averaging circuit 9 gives the measured value of the energy density.

While the invention has been illustrated and described as embodied in energy density measurements in standing ultrasonic wave fields, it is not intended to be limited to the details shown, since various modifications and structural changes may be made without departing in any way from the spirit of the present invention.

What we claim as new and desired to be protected by Letter Patent is set forth in the appended claims:

1. A method for determining the energy density in ultrasonically excited fluids, comprising the steps of distributing a plurality of ultrasonic sensors uniformly over a spherical surface having a diameter equal to an integral multiple of the half sonic wavelength; and adding the measured values derived from the individual ultrasonic sensors, whereby the sum of said measured values is indicative of said energy density.

2. The method as defined in claim 1 wherein said ultrasonic sensors are piezoelectric sensors.

3. The method as defined in claim 2 including the steps of squaring the measured values derived from the individual piezoelectric sensors; and averaging the squared values to obtain an averaged quantity representative of said energy density.

4. The method as defined in claim 2 including the step of sampling the measured values of the individual piezoelectric sensors in periodic sequence.

5. The method as described in claim 4 including the step of squaring the measured values derived from the individual piezoelectric sensors; and averaging the squared values to provide an averaged quantity representative of said energy density.

6. An arrangement for determining the energy density of ultrasonically excited fluids comprising, in combination, a spherical surface member; a plurality of ultrasonic sensors distributed uniformly over said spherical surface member, said sensors transmitting signals indicative of the parameter values sensed; and adding means for adding the measured values derived from said sensors, whereby the sum of said measured values obtained from said adding means is representative of said energy density.

7. The arrangement as defined in claim 6 wherein the diameter of said spherical surface member is an integral multiple of the half sonic wavelength.

8. The arrangement as defined in claim 6 wherein said ultrasonic sensors are spaced from said spherically surface member and are located at the vertices of regular polyhedrons.

9. The arrangement as defined in claim 8 wherein said ultrasonic sensors are arranged at the vertices of combined icosahedrons and dodecahedrons.

10. The arrangement as defined in claim 8 wherein said ultrasonic sensors are arranged at the vertices of combined hexahedrons and octahedrons.

11. The arrangement as defined in claim 6 wherein said ultrasonic sensors comprise ultrasonic absorption members converting the temperature rise in a sonic field into a corresponding electrical signal.

12. The arrangement as defined in claim 11 wherein said sensors comprise thermoelectric elements imbedded in a substance of substantially high sonic absorption capability.

13. The arrangement as defined in claim 12 including gas bubbles within said substance for increasing the sonic absorption capability.

14. The arrangement as defined in claim 11 wherein the terminals of said thermoelectric elements have a cross section so that the heat conduction from said absorption member in both terminals is of the same magnitude.

15. The arrangement as defined in claim 6 including temperature compensation means operatively connected to said thermoelectric elements and mounted within said spherically surface member.

16. The arrangement as defined in claim 15 wherein said temperature compensation means comprises temperature dependent electrical resistor means for compensating the sensitivity of said absorption member against temperature dependency.

17. The arrangement as defined in claim 6 wherein said ultrasonic sensors comprise temperature dependent resistors imbedded in a substance having a substantially high sonic absorption capacity.

18. The arrangement as defined in claim 6 wherein said ultrasonic sensors comprise temperature dependent semiconductors imbedded in a substance of substantially high sonic absorption capacity.

19. The arrangement as defined in claim 6 wherein said ultrasonic sensors consist of piezoelectric elements.